United States Patent [19]

Brehm

[11] 4,260,130
[45] Apr. 7, 1981

[54] VALVE FOR CORROSIVE FLUIDS

[75] Inventor: George L. Brehm, Hilltown, Pa.

[73] Assignee: B & G Equipment Company, Plumsteadville, Pa.

[21] Appl. No.: 61,665

[22] Filed: Jul. 30, 1979

[51] Int. Cl.³ .................. F16K 35/00; F16K 31/58
[52] U.S. Cl. ................... 251/113; 222/525; 222/531; 239/541; 239/579; 251/155; 251/322; 251/353; 251/354
[58] Field of Search ............ 137/315; 251/89, 95, 251/99, 111, 1, 113, 114, 322, 323, 368, 155, 349, 353, 354; 222/509, 525, 531, 532; 239/537, 541, 579

[56] References Cited

U.S. PATENT DOCUMENTS

| | | | |
|---|---|---|---|
| 1,131,794 | 3/1915 | Rhodes | 251/113 |
| 1,504,038 | 8/1924 | Geaslen | 251/95 |
| 2,202,645 | 5/1940 | Brandt | 251/95 |
| 2,369,356 | 2/1945 | Koehn | 251/353 |
| 2,469,642 | 5/1949 | Grewe | 239/541 |
| 2,621,746 | 12/1952 | Beauregard | 251/354 |
| 2,841,314 | 7/1958 | Munson et al. | 251/95 |
| 3,200,839 | 8/1965 | Gallagher | 251/323 |
| 3,357,677 | 12/1967 | Tasker | 251/111 |
| 3,367,622 | 2/1968 | Moore | 251/353 |
| 3,475,005 | 10/1969 | Semon | 251/111 |
| 3,656,711 | 4/1972 | Toelke | 251/368 |
| 4,020,990 | 5/1977 | Luff | 251/111 |

Primary Examiner—Martin P. Schwadron
Assistant Examiner—G. L. Walton
Attorney, Agent, or Firm—Zachary T. Wobensmith, 2nd; Zachary T. Wobensmith, III

[57] ABSTRACT

A valve for the control of corrosive fluids is disclosed which includes a spring returned valve spool in a valve housing, the valve being manually movable by actuation of an exteriorly accessible handle, the valve spool being connected to and movable with a pipe for dispensing, the handle being removably carried on the valve housing, the valve housing having separable portions for access to the interior, the valve spool having a central passageway communicating with the dispensing pipe and having spaced packings movable in a bore, the spool in one position having one packing positioned to permit access of fluid to the central passageway while the other packing prevents access of fluid therebeyond and protects other components associated with the valve spool.

Provisions are also made for locking the spool valve to prevent unintended fluid delivery.

4 Claims, 3 Drawing Figures

VALVE FOR CORROSIVE FLUIDS

BACKGROUND OF THE INVENTION

1. Field of the Invention

This invention relates to valves for corrosive fluids and more particularly to a hand controlled valve which is especially suited for spraying corrosive fluids.

2. Description of the Prior Art

Various control valves have heretofore been proposed for spraying corrosive fluids but these have various shortcomings including likelihood of corrosion of internal parts as well as failure to provide adequate locking to prevent unintended operation.

SUMMARY OF THE INVENTION

In accordance with the invention a valve for the control of spraying of corrosive fluids is provided having a valve spool in a valve housing which is manually movable by actuation of an exteriorly accessible handle, the valve spool being connected to and movable with a pipe connected to the valve, the handle being removably carried on the valve housing and the valve housing having separable portions for access to the valve spool for inspection and maintenance, provision being made for locking the valve for preventing unintended operation.

It is the principal object of the invention to provide a manually operable valve for the control of the flow of corrosive fluids in which the operating parts are of materials which are corrosion resistant and in which other corrodible parts are adequately protected from access of the corrosive fluids.

It is a further object of the invention to provide a valve of the character aforesaid which is simple in construction and is made of readily moldable or formable parts.

It is a further object of the invention to provide a valve of the character aforesaid in which the components can be readily disassembled for inspection and maintenance.

It is a further object of the invention to provide a valve of the character aforesaid with provisions for locking to prevent unintended operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
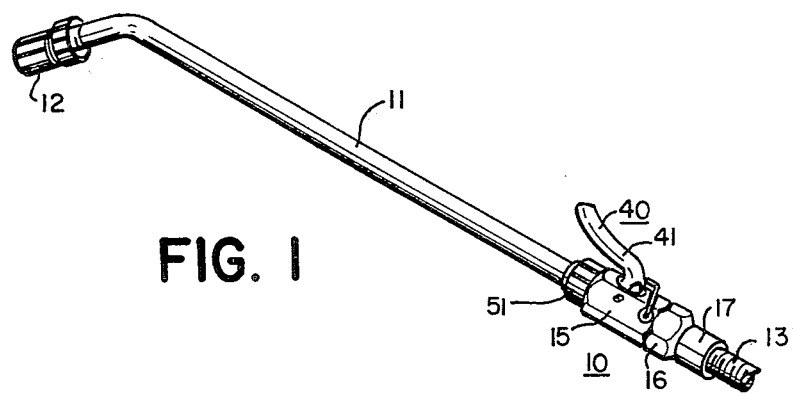
FIG. 1 is a view in perspective of a valve and dispenser in accordance with the invention.
Figure 2:
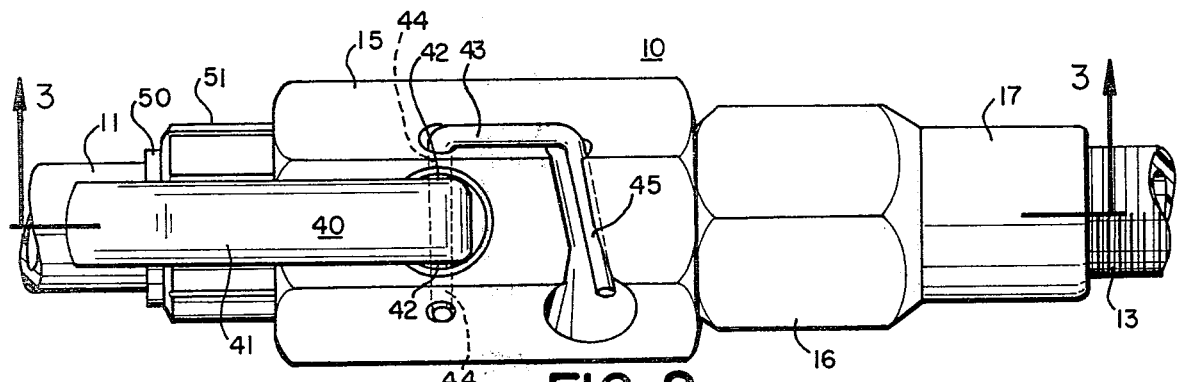
FIG. 2 is a top plan view of the valve of the present invention.
Figure 3:
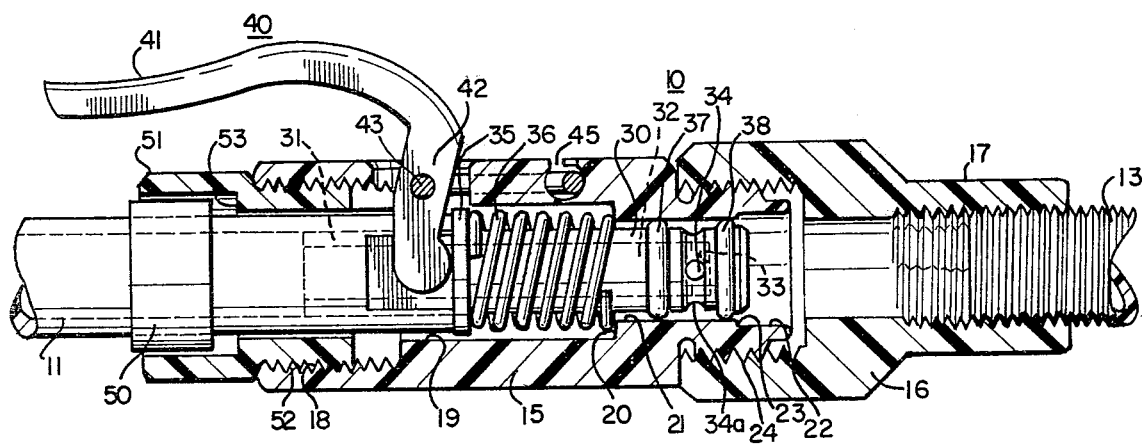
FIG. 3 is a vertical sectional view taken approximately on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, in which a preferred embodiment of the invention is disclosed the valve is shown generally at 10, with a pipe 11 extending forwardly therefrom and having on the end thereof a nozzle fitting 12 for delivery of a solid stream of fluid or of a spray of fluid. A supply pipe 13 is connected to the inlet side of the valve 10 for delivery thereto under pressure of a corrosive liquid, such as an acid for industrial use, such as for cleaning metallic parts which have been machined, for sanitary use, or for other purposes.

The valve 10 has a housing preferably made of a suitable corrosion resistant synthetic plastic, such as polyvinyl chloride, in two parts, a forward part 15 and a rearward part 16. The exteriors of the housing parts 15 and 16 are preferably hexagonal to facilitate assembly and disassembly, with an interiorly threaded cylindrical extension 17 of the part 16 for attachment of the pipe 13. The forward housing part 15 has an interiorly threaded end 18 with a bore 19 extending therefrom and terminating at a shoulder 20, a smaller bore 21 extending therefrom with a larger bore 22 extending to the end of the part 15. At the junction of the bores 21 and 22 a shoulder 23 is provided. The end of the housing part 15 is externally threaded as at 24 for engagement with a complementally threaded portion 25 of the rearward housing part 16.

The rearward housing part 16 has the pipe 13 connected thereto.

The spool valve 30 preferably has an end 31 which is cemented into or otherwise secured to the pipe 11 and has an interior passageway 32 extending therealong and terminating at an end closing wall 33, with an access opening 34 communicating with the passageway 32, with a circumferential groove 34a to facilitate fluid access to the opening 34 in an "on" position. The spool valve 30 is preferably made of a material similar to that of the valve housing.

The spool valve 30, has a metallic spring abutment washer 35 thereon which engages one end of a compression coil spring 36, preferably of metal, the other end of the spring 36 engaging the shoulder 20.

The spool valve 30 also has a packing 37, such as an O-ring carried thereon, engaged with and slidable along the bore 21. Spaced from the packing 37, and on the opposite side of the access opening 34, a packing 38, such as an O-ring is provided, normally engaged with and slidable along the bore 21 but movable past the shoulder 23 for fluid access when desired to the groove 34a and opening 34.

The packings 37 and 38 are preferably of rubber or rubber-like material.

In order to move the spool valve 30 an operating lever 40, which may be stamped from sheet metal, is provided having a manually accessible handle portion 41 and with bifurcations 42 extending inwardly into the bore 19 and engaging the washer 35.

The lever 40 is carried on a removable C-shaped spring pin 43 which extends through aligned openings 44 in the top of the forward housing part 15 and is hooked into a slot 45 on the top of the forward housing part 15 and is removably held therein by its spring force.

In order to lock the pipe 11 and the spool valve 30 in an inactive position, the pipe 11 is provided with a collar 50 and a manually operable nut 51 is provided with a portion 52 in threaded engagement with the internally threaded end 18 and within which the pipe 11 is slidable. The nut 51 has an internal shoulder 53 for engagement with the collar 50 when the nut 51 is turned outwardly, to prevent inward movement of the pipe 11 and the spool valve 30 by pressure on the handle portion 41.

The mode of operation will now be pointed out.

When it is desired to initiate flow, and with the nut 51 turned to its innermost position, the handle portion 41 of the lever 40 can be pressed with the valve 10 in one hand and with the thumb of the user on the handle portion 41.

Pressure on the handle portion 41 is effective through the bifurcations 42 and the washer 35, against the force of the spring 36, to move the packing 38 along the bore 21 and beyond the shoulder 23. This will permit fluid to enter the bore 21 and move through the grooves 34a, access opening 34, and interior passageway 32 for advance through the pipe 11 for delivery. Release of the pressure on the handle portion 41 will permit the spring 36 to return the packing 38 within the bore 21 to cut off further flow. Access of fluid along the bore 21 is prevented by the packing 37 so that the spring 36, washer 35 and bifurcations 42 are not exposed to the corrosive fluid.

The return movement of the pipe 11 and spool valve 30 may be limited by the engagement of the bifurcations 42 with the forward housing part 15.

Access to the moving parts can be readily effected by removal of the spring pin 43, removal of the operating lever 40 and removal of the pipe 11 and the spool valve 30 attached thereto. The structure can be readily reassembled by a reversal of the operations just described.

I claim:

1. A portable hand operated valve for corrosive liquid which comprises
   housing means of corrosion resistant material having a separable forward housing part and a rearward housing part,
   a fluid supply pipe connected to said rearward housing part and communicating with a bore in said rearward housing part,
   a dispensing pipe extending within said forward housing part,
   a spool valve of corrosion resistant material connected to said dispensing pipe and movable therewith,
   said forward housing part having a first bore within which said dispensing pipe is movable, a second bore within which said spool valve is movable and a third bore aligned with and beyond said second bore,
   said spool valve having spaced packing members movable in said second bore and one of which is movable beyond said second bore and into said third bore to permit liquid flow,
   a handle member for moving said dispensing pipe and said spool valve in one direction,
   a spring on said valve spool and in engagement with an abutment on said spool valve and a shoulder between said first and second bores for moving said pipe, said spool valve and said handle in the opposite direction,
   said spool valve having an access opening between said packing members communicating with said dispensing pipe through the interior of said spool valve,
   said spool valve being movable by said handle to a position with said one of said packing members in said third bore for access of fluid to said access opening and to said dispensing pipe,
   the other of said packing members preventing access of fluid therebeyond in said second bore, and
   locking means for preventing movement of said handle member,
   said locking means comprising an enlargement on said dispensing pipe and adjustable means on said housing for engagement with the enlargement.

2. The combination defined in claim 1 in which said spaced packing members are O-rings.

3. The combination defined in claim 1 in which said handle member has a portion engageable with said abutment member, and
   said handle member is detachably pivotally mounted on said housing means.

4. A portable hand operated valve for corrosive fluid which comprises
   housing means having a fluid supply pipe connected thereto at one end,
   said housing means having a plurality of aligned bores therein and having a first bore in communication with said fluid supply pipe,
   a dispensing pipe at the other end of said housing means havingg a spool valve interiorly disposed in said housing means connected thereto and movable therewith,
   a handle member for moving said dispensing pipe and said spool valve in one direction,
   a spring on said valve spool and in engagement with a shoulder in one of said bores for moving said pipe and said spool valve in the opposite direction,
   said housing means having a second bore aligned with and in communication with said first bore,
   spaced packing members on said spool valve and movable in said second bore,
   said spool valve having an access opening between said packing members communicating with said dispensing pipe through the interior of said spool valve,
   said spool valve being movable by said handle to a position with one of said packing members in said first bore for access of fluid to said access opening and to said dispensing pipe,
   the other of said packing members preventing access of fluid therebeyond in said second bore, and
   locking means for preventing movement of said handle member,
   said locking means comprising an enlargement on said dispensing pipe and a nut threaded in said other end of said housing means having a shoulder for engagement with said enlargement.

* * * * *